(12) United States Patent
Qi et al.

(10) Patent No.: US 7,912,013 B2
(45) Date of Patent: *Mar. 22, 2011

(54) METHODS AND APPARATUS FOR PROVIDING A ROAMING SUPPORT SYSTEM

(75) Inventors: Emily H. Qi, Portland, OR (US); Xingang Guo, Portland, OR (US)

(73) Assignee: Intel Corporation, Santa Clara ( * ) Notice: Subject to any disclaimer, the term of this patent is extended or adjusted under 35 U.S.C. 154(b) by 0 days.

This patent is subject to a terminal disclaimer.

(21) Appl. No.: 12/638,256

(22) Filed: Dec. 15, 2009

(65) Prior Publication Data

US 2010/0093343 A1   Apr. 15, 2010

Related U.S. Application Data

(63) Continuation of application No. 11/187,659, filed on Jul. 22, 2005, now Pat. No. 7,660,278.

(51) Int. Cl.
*H04W 4/00* (2009.01)

(52) U.S. Cl. ........ 370/332; 370/328; 370/331; 370/338; 455/432.1; 455/436; 455/442

(58) Field of Classification Search .................. 370/332, 370/328, 338, 331; 455/432.1, 436, 442
See application file for complete search history.

(56) References Cited

U.S. PATENT DOCUMENTS

| 5,396,645 | A | 3/1995 | Huff | |
| 5,953,320 | A | 9/1999 | Williamson et al. | |
| 6,240,092 | B1 * | 5/2001 | Monch | 370/408 |
| 6,256,500 | B1 | 7/2001 | Yamashita | |
| 6,873,847 | B2 * | 3/2005 | Shimono et al. | 455/441 |
| 7,493,137 | B2 * | 2/2009 | Iwanaga et al. | 455/525 |

FOREIGN PATENT DOCUMENTS

WO    WO 98/18281    4/1998

* cited by examiner

*Primary Examiner* — Nghi H Ly
(74) *Attorney, Agent, or Firm* — Schwabe, Williamson & Wyatt, P.C.

(57) ABSTRACT

Embodiments of methods and apparatus for providing a roaming support system are generally described herein. Other embodiments may be described and claimed.

26 Claims, 6 Drawing Sheets

METHODS AND APPARATUS FOR PROVIDING A ROAMING SUPPORT SYSTEM

CROSS REFERENCE TO RELATED APPLICATIONS

This application is a continuation of U.S. patent application Ser. No. 11/187,659, filed Jul. 22, 2005, and claims priority to that date.

TECHNICAL FIELD

The present disclosure relates generally to wireless communication systems, and more particularly, to methods and apparatus for providing a roaming support system.

BACKGROUND

As technology advances to provide greater mobility and/or portability, more and more people are using wireless electronic devices for a variety of reasons such as work, education, and/or entertainment. With the increased popularity of wireless electronic devices, the demand for resources in wireless environments may cause network congestions and slowdowns. Thus, quality of service and performance may be degraded on the user end.

DETAILED DESCRIPTION

In general, methods and apparatus for providing a roaming support system are described herein. The methods and apparatus described herein are not limited in this regard.

Figure 1:
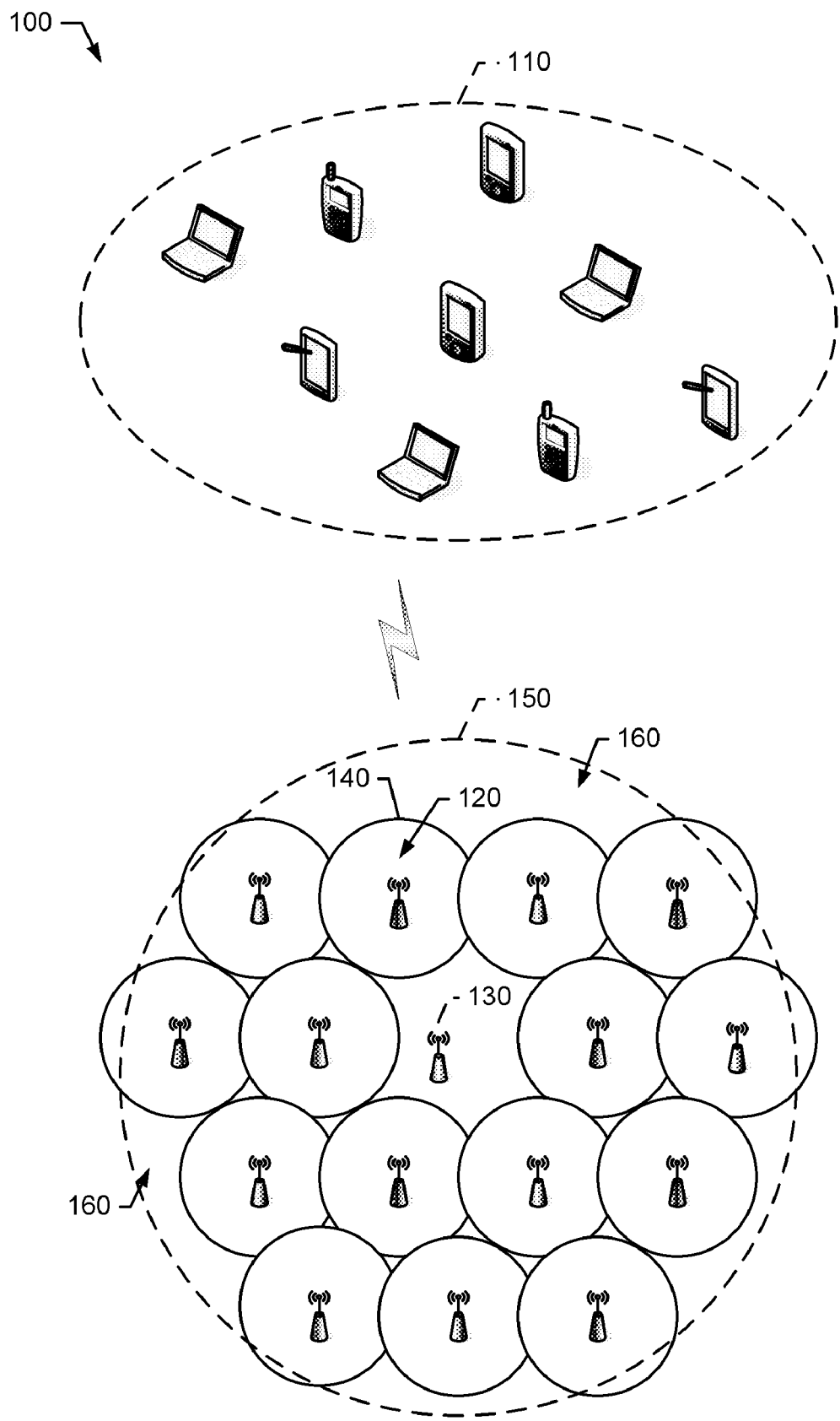
FIG. 1 is a schematic diagram representation of an example wireless communication system according to an embodiment of the methods and apparatus disclosed herein.

Referring to FIG. 1, an example wireless communication system 100 may include one or more client devices, generally shown as 110. For example, the client devices 110 may include wireless electronic devices such as a laptop computer, a handheld computer, a tablet computer, a cellular telephone (e.g., a smart phone), a pager, an audio and/or video player (e.g., an MP3 player or a DVD player), a gaming device, a digital camera, a navigation device (e.g., a GPS device), a wireless peripheral (e.g., a headset, a keyboard, a mouse, etc.), a medical device (e.g., a heart rate monitor, a blood pressure monitor, etc.), and/or other suitable mobile or portable electronic devices. Although FIG. 1 depicts nine wireless electronic devices, the wireless communication system 100 may include more or less wireless electronic devices.

The client devices 110 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless communication links.

In one example, one or more of the client devices 110 may implement OFDM modulation to transmit large amounts of digital data by splitting a radio frequency signal into multiple small sub-signals, which in turn, are transmitted simultaneously at different frequencies. In particular, the client devices 110 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via wireless communication links.

For example, the client devices 110 may operate in accordance with the 802.16 family of standards developed by IEEE to provide for fixed, portable, and/or mobile broadband wireless access (BWA) networks (e.g., the IEEE std. 802.16, published 2004). The client devices 110 may also use direct sequence spread spectrum (DSSS) modulation (e.g., the IEEE std. 802.11b) and/or frequency hopping spread spectrum (FHSS) modulation (e.g., the IEEE std. 802.11). Although the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). For example, the client devices 110 may also operate in accordance with other suitable wireless communication protocols that require very low power such as Bluetooth®, Ultra Wideband (UWB), and/or radio frequency identification (RFID) to communicate via wireless links.

The wireless communication system 100 may also include one or more communication nodes with each communication node being associated with one or more communication networks. In one example, the wireless communication system 100 may include one or more access points (AP), generally shown as 120 and 130, with each AP being associated with a basic service set (BSS) network. The APs 120 and 130 may be operatively coupled to a common public or private network such as the Internet, a telephone network, a local area network (LAN), a cable network, and/or another wireless network via connection to an Ethernet, a digital subscriber line (DSL), a telephone line, a coaxial cable, and/or any wireless connection, etc.

In particular, one or more APs may be a high density AP (HD-AP) 120. Each HD-AP 120 may provide wireless communication services (e.g., data, voice, and/or video transmissions) to one or more of the client devices 110 within a coverage area of an HD cell, generally shown as 140. In one example, each of the HD cells 140 may be configured as a coverage area smaller than a typical BSS cell to provide greater bandwidth for the client devices 110 served by the corresponding HD-AP 120. To reduce interference and channel contention among the client devices 110 served by the HD-APs 120, the HD cells 140 may be configured in a manner to minimize coverage overlap. For example, the client devices 110 and/or the HD-APs 120 may cooperatively adjust radio parameters such as transmission power, reception sensitivity, clear-channel-assessment threshold, etc. Although FIG. 1 depicts fifteen HD-APs, the wireless communication system 100 may include more or less HD-APs. Accordingly, the wireless communication system 100 may include more or less HD cells.

Although HD-APs 120 may improve channel capacity performance and data throughput by providing wireless communication services to a smaller number of client devices 110, handovers between the HD-APs 120 may occur frequently to accommodate moving client devices 110. For example, the client devices 110 may roam on a more frequency basis relative to HD cells 140 because of the smaller coverage area of each HD-AP 120.

In the wireless communication system 100, one or more APs may be a roaming support AP (RS-AP) 130. Each RS-AP 130 may provide wireless communication services (e.g., data, voice, and/or video transmissions) to the client devices 110 within a coverage area of an RS cell, generally shown as 150. The RS cell 150 may entirely or partially encompass one or more of the HD cells 140. That is, the coverage area of each HD cell 140 is relatively smaller than the coverage area of the RS cell 150. Accordingly, the coverage area of the RS cell 150 may entirely or partially include one or more coverage areas of the HD cells 140. Further, the coverage area of the RS cell 150 may also include one or more areas that are not covered by any of the HD cells 140 (e.g., non-HD cell areas), generally shown as 160. Thus, the RS cell 150 may provide seamless roaming when the client devices 110 are moving in or out of the HD cells 140 and the non-HD cell areas 160 whereas the HD cells 140 may provide increased data throughput when the client devices 110 are relatively stationary. Although FIG. 1 depicts one RS-AP, the wireless communication system 100 may include more RS-APs. Accordingly, the wireless communication system 100 may include more RS cells.

Although the above examples described an HD-AP and an RS-AP as separate devices, an AP may be configured to operate as an HD-AP and/or RS-AP. For example, the AP may initially operate as an HD-AP via a first channel and then switch to operate as an RS-AP via a second channel, or vice versa.

While the above examples are described with respect to APs, the methods and apparatus described herein may applicable to mesh points, base stations, and/or other suitable communication nodes. For example, the wireless communication system 100 may also include one or more radio access networks (RANs) such as a cellular radio network. The RAN may include one or more base stations, and other radio components necessary to provide communication services to the client devices 110. The base stations may operate in accordance with the applicable standard(s) for providing wireless communication services to the client devices 110. That is, one or more of the client devices 110 may be configured to operate in accordance with one or more wireless communication protocols to communicate with the base stations.

The wireless communication protocols may be based on analog, digital, and/or dual-mode communication system standards that use multiple access techniques such as frequency division multiple access (FDMA), time division multiple access (TDMA), and/or code division multiple access (CDMA). For example, the wireless communication protocols may include Global System for Mobile Communications (GSM), Wideband CDMA (W-CDMA), General Packet Radio Services (GPRS), Enhanced Data GSM Environment (EDGE), Universal Mobile Telecommunications System (UMTS), High-Speed Downlink Packet Access (HSDPA), variations and evolutions of these standards, and/or other suitable wireless communication standards.

Further, the wireless communication system 100 may include other wireless personal area network (WPAN) devices, wireless local area network (WLAN) devices, wireless metropolitan area network (WMAN) devices, and/or wireless wide area network (WWAN) devices such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system (not shown). Accordingly, the wireless communication system 100 may be implemented to provide WPANs, WLANs, WMANs, WWANs, and/or other suitable wireless communication networks. Although certain examples have been described above, the scope of coverage of this disclosure is not limited thereto.

Figure 2:
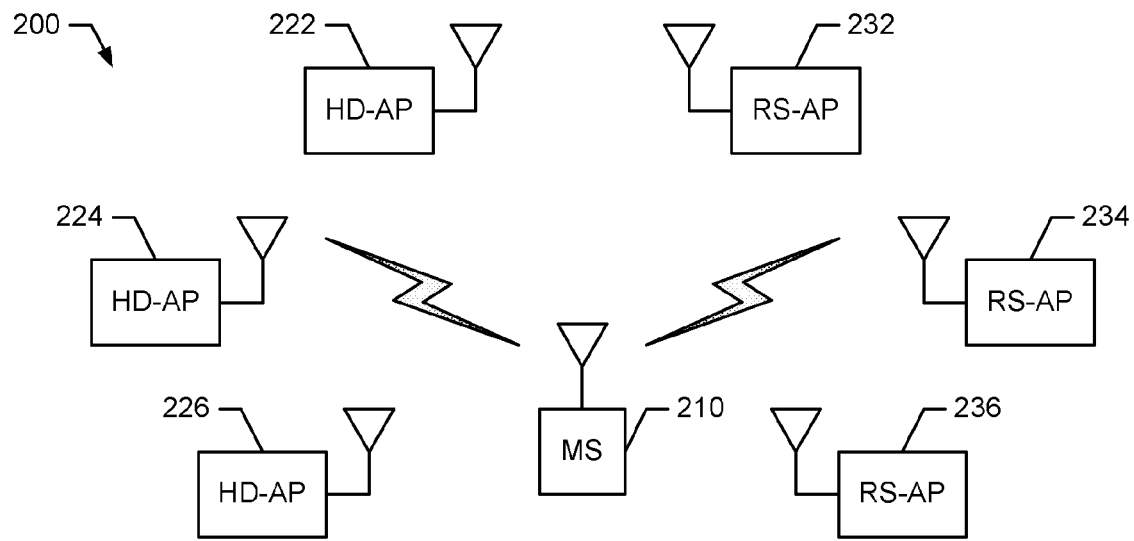
FIG. 2 is a block diagram representation of an example roaming support system.

In the example of FIG. 2, a roaming support system 200 may include a mobile station (MS) 210 (e.g., one of the client devices 110 of FIG. 1). The MS 210 may be a wireless electronic device such as a laptop computer, a handheld computer, a tablet computer, a cellular telephone (e.g., a smart phone), a pager, an audio and/or video player (e.g., an MP3 player or a DVD player), a gaming device, a digital camera, a navigation device (e.g., a GPS device), a wireless peripheral (e.g., a headset, a keyboard, a mouse, etc.), a medical device (e.g., a heart rate monitor, a blood pressure monitor, etc.), and/or other combination thereof. Although FIG. 2 depicts one MS, the roaming support system 200 may include additional MS.

The roaming support system 200 may also include one or more HD-APs, generally shown as 222, 224, and 226, and one or more RS-APs, generally shown as 232, 234, and 236. As noted above, each of the HD-APs 222, 224, and 226 may provide wireless communication services within a coverage area of an HD cell (e.g., generally shown as 140 in FIG. 1). Each of the RS-APs 232, 234, and 236 may provide wireless communication services within a coverage area of an RS cell (e.g., generally shown as 150 in FIG. 1). For example, the wireless communication services provided by the HD-APs 222, 224, and 226 and the RS-APs 232, 234, and 236 may include data, voice, and/or video transmissions such as voice over Internet Protocol (VoIP), video streaming, etc.). Although FIG. 2 depicts three HD-APs, the roaming support system 200 may include more or less HD-APs. Likewise, the roaming support system 200 may also include more or less RS-APs.

In one example, the MS 210 may initially associate with one of the HD-APs such as the HD-AP 224 (e.g., the associated AP). Accordingly, the MS 210 and the HD-AP 224 may be communicatively coupled to the each other so that the HD-AP 224 may provide wireless communication services to the MS 210. An initial AP association may occur when the MS 210 is not associated with any other APs (e.g., during power up of the MS 210).

The MS 210 may receive neighbor AP information from the HD-AP 224 (e.g., via a neighbor AP report). In one example, the MS 210 may request for the neighbor AP report from the HD-AP 224. In addition or alternatively, the HD-AP 224 may automatically provide the neighbor AP report to the MS 210. The neighbor AP report from the HD-AP 224 may include information associated with one or more neighboring HD-APs and/or RS-APs relative to the HD-AP 224.

For example, the neighbor AP report from the HD-AP 224 may include information associated with HD-APs and/or RS-APs that may be physically adjacent to the HD-AP 224, within line-of-sight of the HD-AP 224, communicatively coupled to the HD-AP 224, and/or within other suitable proximity relative to the HD-AP 224. In one example, the neighbor AP report from the HD-AP 224 may include information associated with the HD-AP 222 and/or the HD-AP 226. The neighbor AP report may also include information associated with HD cells corresponding to the HD-AP 222 and/or the HD-AP 226. In a similar manner, the neighbor AP report from the HD-AP 224 may also include information associated with the RS-AP 232, the RS-AP 234, and/or the RS-AP 236, and corresponding RS cells.

Figure 3:
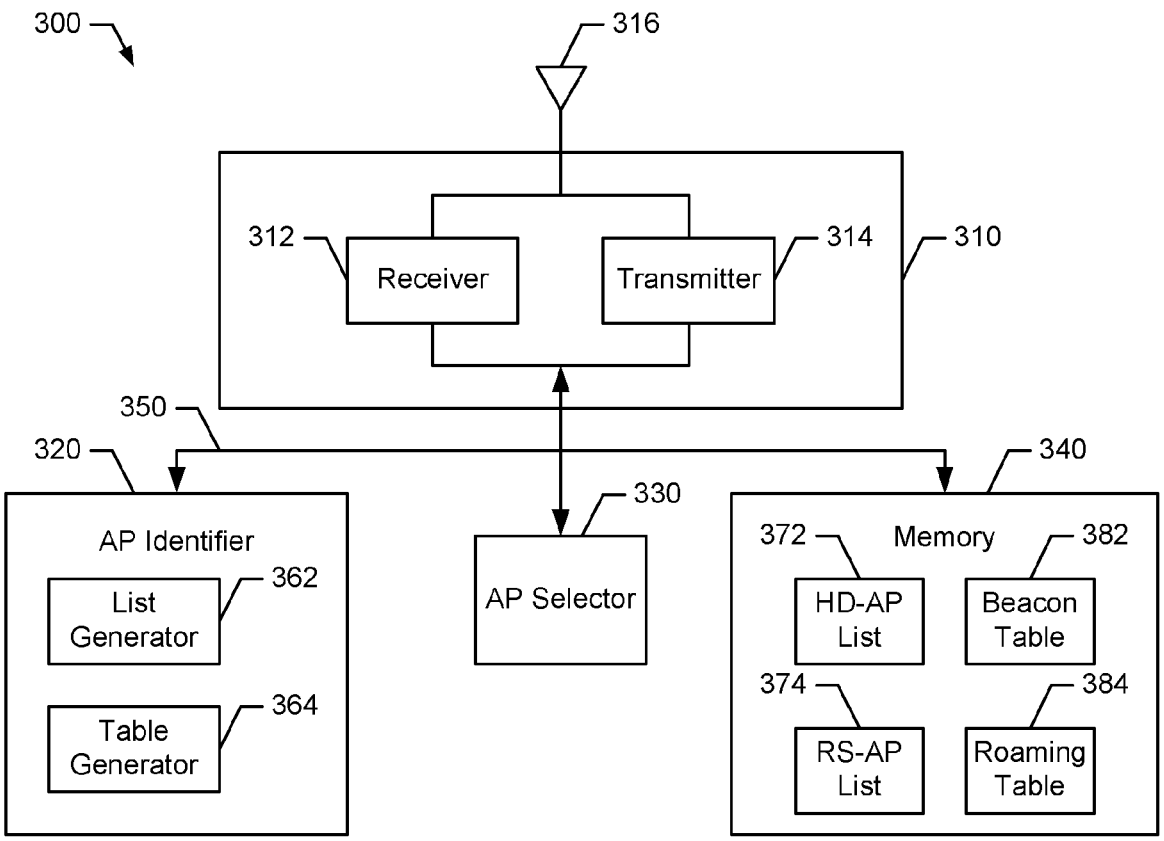
FIG. 3 is a block diagram representation of an example mobile station.

Based on the neighbor AP report, the MS 210 may generate and/or update a preferred HD-AP list (e.g., the HD-AP list 372 of FIG. 3) and a preferred RS-AP list (e.g., the RS-AP list 374 of FIG. 3). As described in detail below, the preferred HD-AP list may include one or more HD-APs for the MS 210 to select from for wireless communication services. For example, the preferred HD-AP list may include the HD-AP 222 and/or 226 based on the neighbor AP report from the HD-AP 224. Likewise, the preferred RS-AP list may include one or more RS-APs for the MS 210 to select from for wireless communication services. For example, the preferred RS-AP list may include the RS-APs 232, 234, and/or 236 based on the neighbor AP report from the HD-AP 224. Although the above example HD-AP list and RS-AP list are described with respect to proximity of neighbor APs relative to the HD-AP 224, the methods and apparatus disclosed herein may generate the preferred HD-AP list and the preferred RS-AP list based on other suitable parameters such as transmission power, channel capacity, etc. of APs that may provide wireless communication services to the MS 210.

As noted above, an RS-AP (e.g., the RS-AP 234) may provide seamless roaming when the MS 210 are moving in or out of the HD cells and the non-HD cell areas whereas an HD-AP (e.g., the HD-AP 224) may provide increased data throughput when the MS 210 is relatively stationary. To select an HD-AP or an RS-AP for wireless communication services, the MS 210 may also generate a beacon table (e.g., the beacon table 382 of FIG. 3) and a roaming table (e.g., the roaming table 384 of FIG. 3) based on the neighbor AP report. In particular, the beacon table may include an AP identifier (e.g., BSSID) associated with each neighbor HD cell, a received signal strength indication (RSSI) value of a beacon or probe response associated with each BSSID, a counter indicative of a total number of changes in the maximum RSSI value (RSSI-change counter), and a maximum RSSI identifier (e.g., BSSID-MAX) corresponding to the BSSID with the maximum RSSI. In one example, the beacon table may include a BSSID for each of the HD-APs 222 and 226. The RSSI value may be a measure by the physical (PHY) layer of the energy observed at an antenna of the MS 210 (e.g., the antenna 316 of FIG. 3). The RSSI-change counter may be initially calibrated to zero. After each beacon scanning, the RSSI-change counter may increment by one if the BSSID-MAX changes. For example, the RSSI-change counter may increment by one if the BSSID-MAX changed from the BSSID of the HD-AP 222 to the BSSID of the HD-AP 226.

The roaming table may include a BSSID associated with each neighbor HD cell as in the beacon table. The roaming table may also include a timestamp associated with each BSSID and a roaming counter corresponding to a total number of HD cell handovers (e.g., handovers between the HD-APs 222, 224, and 226). In particular, the roaming counter may indicate a number of handovers as the MS 210 moves from one HD cell to another HD cell for a predefined time period (e.g., via the timestamps). After each handover, the roaming counter may increment by one. For example, the roaming counter may increment by one if the MS 210 moved from the HD cell corresponding to the HD-AP 222 to the HD cell corresponding to the HD-AP 226.

Based on the HD-AP list, the RS-AP list, the beacon table, and/or the roaming table, the MS 210 may reduce handovers and enable seamless roaming as described in detail below. In particular, the MS 210 may select an HD-AP for wireless communication services whereas being relatively stationary to achieve greater data throughput. Alternatively, the MS 210 may select an RS-AP to roam seamlessly within a corresponding RS cell that includes one or more HD cells and non-HD cell areas. The methods and apparatus described herein are not limited this regard.

Turning to FIG. 3, an MS 300 (e.g., the MS 210 of FIG. 2) may include a communication interface 310, an AP identifier 320, an AP selector 330, and a memory 340. Although FIG. 3 depicts components of the MS 300 coupling to each other via a bus 350, these components may be operatively coupled to each other via other suitable direct or indirect connections (e.g., a point-to-point connection).

The communication interface 310 may include a receiver 312, a transmitter 314, and an antenna 316. The communication interface 310 may receive and/or transmit data via the receiver 312 and the transmitter 314, respectively. The antenna 316 may include one or more directional or omnidirectional antennas such as dipole antennas, monopole antennas, patch antennas, loop antennas, microstrip antennas, and/or other types of antennas suitable for transmission of radio frequency (RF) signals. Although FIG. 3 depicts a single antenna, the MS 300 may include additional antennas. For example, the MS 300 may include a plurality of antennas to implement a multiple-input-multiple-output (MIMO) system.

As described in detail below, the AP identifier 320 may include a plurality of HD-APs and a plurality of RS-APs that the MS 300 may select from for wireless communication services. In particular, the AP identifier 320 may include a list generator 362 and a table generator 364. The list generator 362 may generate and/or update an HD-AP list 372 and an RS-AP list 374. The HD-AP list 372 and the RS-AP list 374 may be stored in the memory 350. The table generator 364 may generate a beacon table 382 and a roaming table 384. The beacon table 382 and the roaming table 384 may be stored in the memory 350.

The AP selector 330 may select an HD-AP from the HD-AP list 372 or an RS-AP from the RS-AP list 374 based on the beacon table 382 and/or the roaming table 384. For example, an RS-AP from the RS-AP list 374 may provide seamless roaming when the MS 300 are moving in or out of HD cells and non-HD cell areas whereas an HD-AP from the HD-AP list 372 may provide increased data throughput when the MS 300 is relatively stationary.

While the components shown in FIG. 3 are depicted as separate blocks within the MS 300, the functions performed by some of these blocks may be integrated within a single semiconductor circuit or may be implemented using two or more separate integrated circuits. For example, although the receiver 312 and the transmitter 314 are depicted as separate blocks within the communication interface 310, the receiver 312 may be integrated into the transmitter 314 (e.g., a transceiver). In a similar manner, the list generator 362 and the table generator 364 within the AP identifier 320 may be integrated into a single component. In another example, although the AP identifier 320 and the AP selector 330 are depicted as separate blocks, the AP identifier 320 and the AP selector 330 may be integrated into a single component. The methods and apparatus described herein are not limited in this regard.

Figure 4:
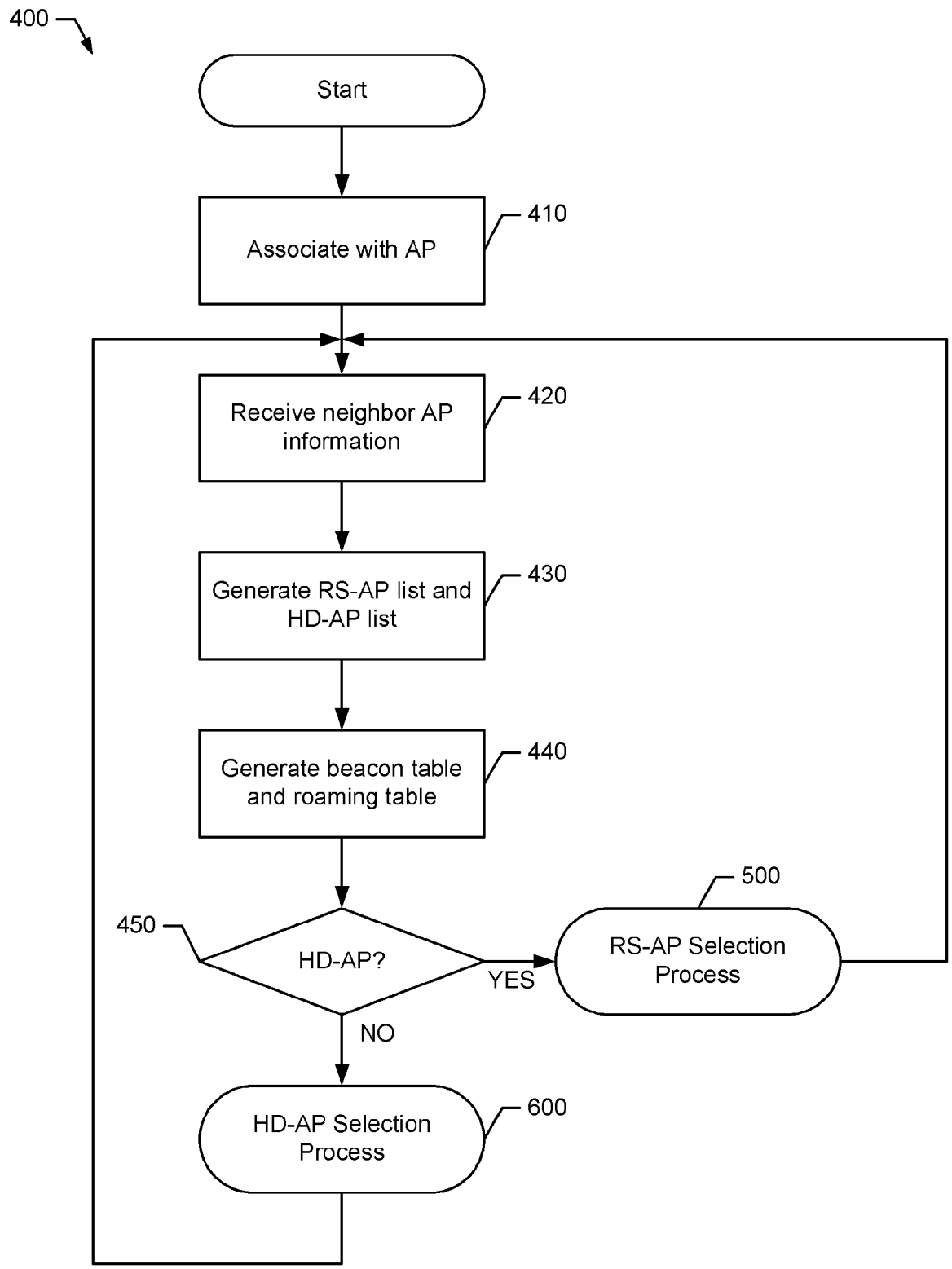
FIG. 4 is a flow diagram representation of one manner in which an example mobile station of FIG. 3 may be configured to operate in an example roaming support system of FIG. 2.

FIG. 4 depicts one manner in which the example MS 300 of FIG. 3 may be configured to operate in a roaming support system. The example process 400 of FIG. 4 may be implemented as machine-accessible instructions utilizing any of many different programming codes stored on any combination of machine-accessible media such as a volatile or non-volatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 4, these actions may be performed in other temporal sequences. Again, the example process 400 is merely provided and described in conjunction with the apparatus of FIGS. 1, 2, and 3 as an example of one way to configure a mobile station to operate in the roaming support system 200.

In the example of FIG. 4, the process 400 may begin with the MS 300 associating with an AP (e.g., the associated AP) (block 410). For example, the MS 300 may associate with an HD-AP during an initial AP association. In one example, the MS 210 may communicate with the HD-AP 224 to establish wireless communication.

The MS 300 (e.g., via the communication interface 310) may receive neighbor AP information from the associated AP (block 420). The neighbor AP information may include information associated with HD-APs and/or RS-APs that may be physically adjacent to the associated AP, within line-of-sight of the associated AP, communicatively coupled to the associated AP, and/or within other suitable proximity relative to the associated AP. In one example, the MS 210 may receive a neighbor AP report from the HD-AP 224 with information associated with the HD-APs 222 and/or 226, and/or the RS-APs 232, 234, and/or 236.

Based on the neighbor AP information, the MS 300 (e.g., via the AP identifier 320) may identify one or more HD-APs and RS-APs to select from for wireless communication services. In particular, the MS 300 (e.g., via the list generator 362) may generate or update the HD-AP list 372 and the RS-AP list 374 (block 430). In one example, the HD-AP list from the HD-AP 224 may include the HD-AP 222 and the HD-AP 226. The RS-AP list from the HD-AP 224 may include the RS-AP 232, the RS-AP 234, and the RS-AP 236.

The MS 300 (e.g., via the table generator 364) may generate the beacon table 382 and the roaming table 384 (block 440). The beacon table 382 and the roaming table 384 may include information for the MS 300 to select an HD-AP or an RS-AP for wireless communication services.

The MS 300 may determine whether the associated AP from block 410 is an HD-AP (block 450). In one example, the associated AP may initially be an HD-AP. Accordingly, control may proceed to an RS-AP selection process 500. In general, the RS-AP selection process 500 may determine whether to connect to an RS-AP to establish wireless communication services for the MS 300.

Figure 5:
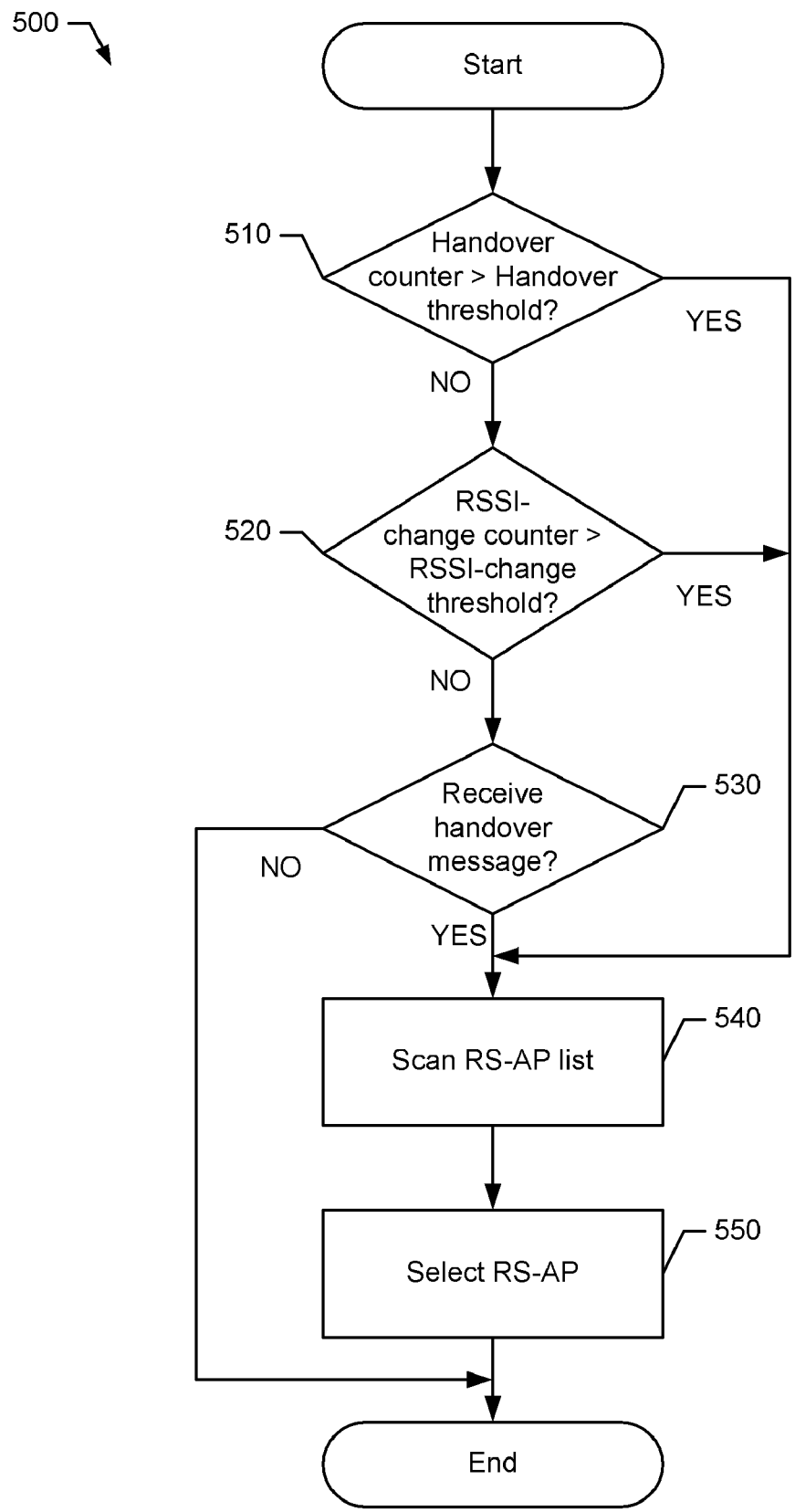
FIG. 5 is a flow diagram representation of one manner in which an example mobile of FIG. 3 may be configured to select a roaming support access point.

Turning to FIG. 5, the process 500 may begin with the MS 300 determining whether the roaming counter is greater than a predefined roaming threshold during a predefined time period based on the roaming table 384 (block 510). If the roaming counter is greater than the roaming threshold, control may proceed to block 540 to scan the RS-AP list 374. Based on the RS-AP list 374, the MS 300 may select an RS-AP for wireless communication services (block 550). Accordingly, a handover from the associated AP (e.g., an HD-AP) to the selected RS-AP may occur. In one example, the associated AP may be the HD-AP 224. The MS 210 may select the RS-AP 234, and thus, a handover from the HD-AP 224 to the RS-AP 234 may occur so that the RS-AP 234 may provide wireless communication services to the MS 210. The process 500 may terminate and control may return to block 420 of FIG. 4.

Otherwise if the roaming counter is less than or equal to the roaming threshold at block 510, control may proceed to block 520 to determine whether the RSSI-change counter is greater than a predefined RSSI-change threshold based on the beacon table 382. As noted above, the RSSI-change counter may indicate a total number of changes in the maximum RSSI value. If the RSSI-change counter is greater than the RSSI-change threshold, control may proceed directly to blocks 540 and 550 as described above. Accordingly, the selected RS-AP from block 550 may provide the MS 300 with wireless communication services. Otherwise if the RSSI-change counter is less than or equal to the RSSI-change threshold, the MS 300 may monitor for a handover message to switch to an RS-AP from the associated AP (block 530).

If the MS 300 receives a handover message from the associated AP, control may proceed to blocks 540 and 550 as described above. The selected RS-AP may provide the MS 300 with wireless communication services. Otherwise if the MS 300 fails to receive a handover message from the associated AP, the process 500 may terminate and control may return to block 420 of FIG. 4. Thus, the associated AP may continue to provide the MS 300 with wireless communication services. The methods and apparatus described herein are not limited in this regard.

Referring back to block 450 of FIG. 4, if the associated AP is not an HD-AP, control may proceed to an HD-AP selection process 600. In general, the HD-AP selection process 600 may determine whether to connect to an HD-AP to establish wireless communication services for the MS 300.

Figure 6:
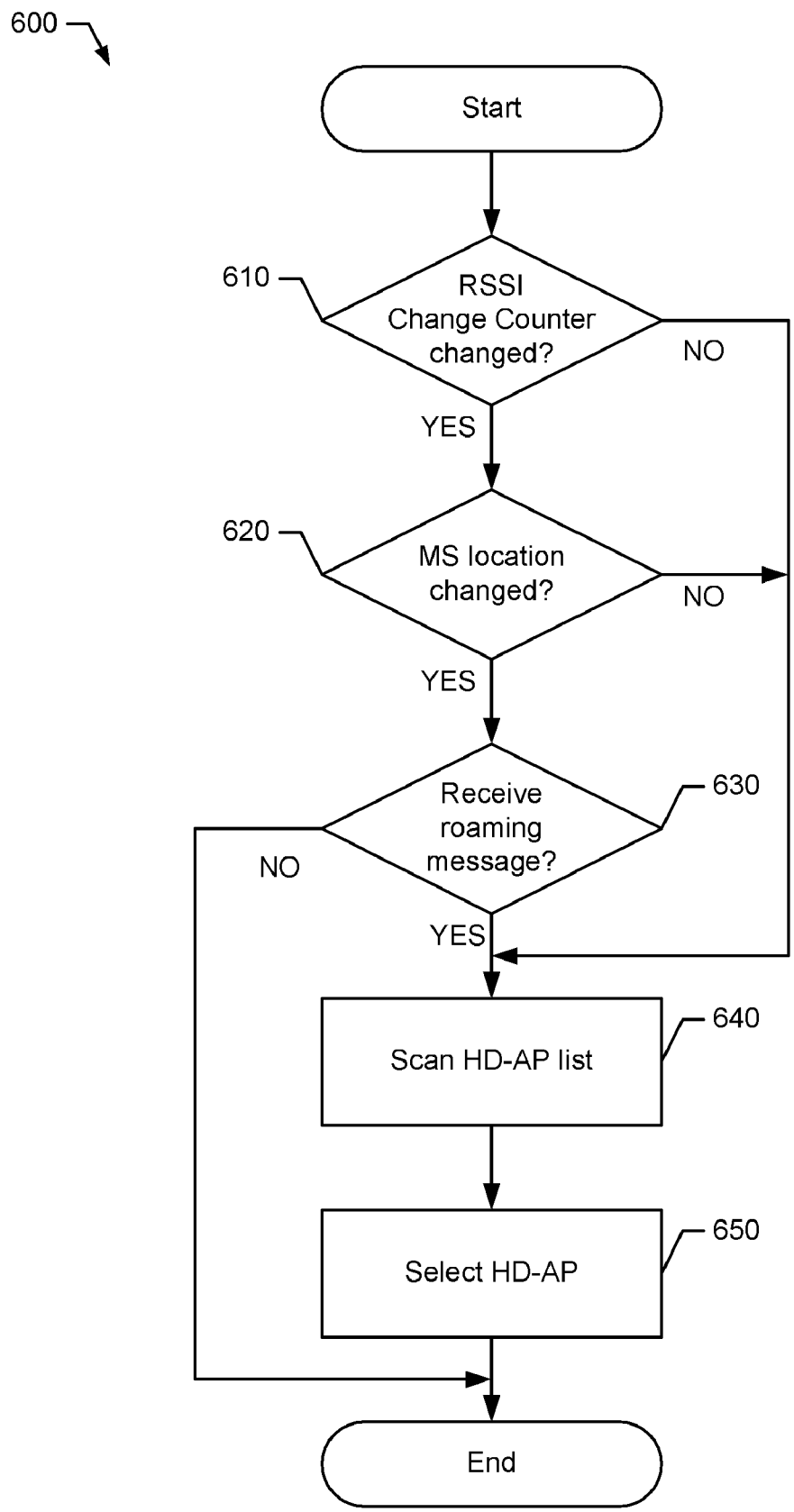
FIG. 6 is a flow diagram representation of one manner in which an example mobile station of FIG. 3 may be configured to select a high density access point.

In the example of FIG. 6, the process 600 may begin with the MS 300 determining whether the RSSI-change counter has changed based on the beacon table 382 (block 610). As noted above, the RSSI-change counter may increment by one if the BSSID-MAX changes after a beacon scanning. If the RSSI-change counter has not changed, control may proceed to block 640 to scan the HD-AP list 372. Based on the HD-AP list 372, the MS 300 may select an HD-AP for wireless communication services (block 650). In one example, the associated AP may be the RS-AP 234, and the MS 210 may select the HD-AP 222. Accordingly, a handover from the RS-AP 234 to the HD-AP 222 may occur so that the HD-AP 222 may provide wireless communication services to the MS 210. The process 600 may terminate and control may return to block 420 of FIG. 4.

Otherwise if the RSSI-change counter has changed at block 610, control may proceed to block 620 to determine whether the location of the MS 300 has changed for a predefined time period. If the location of the MS 300 has not changed, control may proceed directly to blocks 640 and 650 as described above. Accordingly, the selected HD-AP from block 650 may provide the MS 300 with wireless communication services. Otherwise if the location of the MS 300 has changed, the MS 300 may monitor for a handover message to switch to an HD-AP from the associated AP (block 530).

If the MS 300 receives a handover message from the associated AP, control may proceed to blocks 640 and 650 as described above. The selected HD-AP from block 650 may provide the MS 300 with wireless communication services. Otherwise if the MS 300 fails to receive a handover message from the associated AP, the process 600 may terminate and control may return to block 420 of FIG. 4. Thus, the associated AP may continue to provide the MS 300 with wireless communication services. The methods and apparatus described herein are not limited in this regard.

While the methods and apparatus disclosed herein are described in FIGS. 4, 5, and 6 to operate in a particular manner, the methods and apparatus disclosed herein are readily applicable without certain blocks depicted in FIGS. 4, 5, and 6. Further, although the methods and apparatus disclosed herein are described with respect to APs and BSS networks, the methods and apparatus disclosed herein are readily applicable to many other types of wireless communication systems (e.g., WPANs, WLANs, WMANs, and/or WWANs). In one example, the methods and apparatus disclosed herein may be applicable to base stations and RANs. The methods and apparatus described herein are not limited in this regard.

Figure 7:
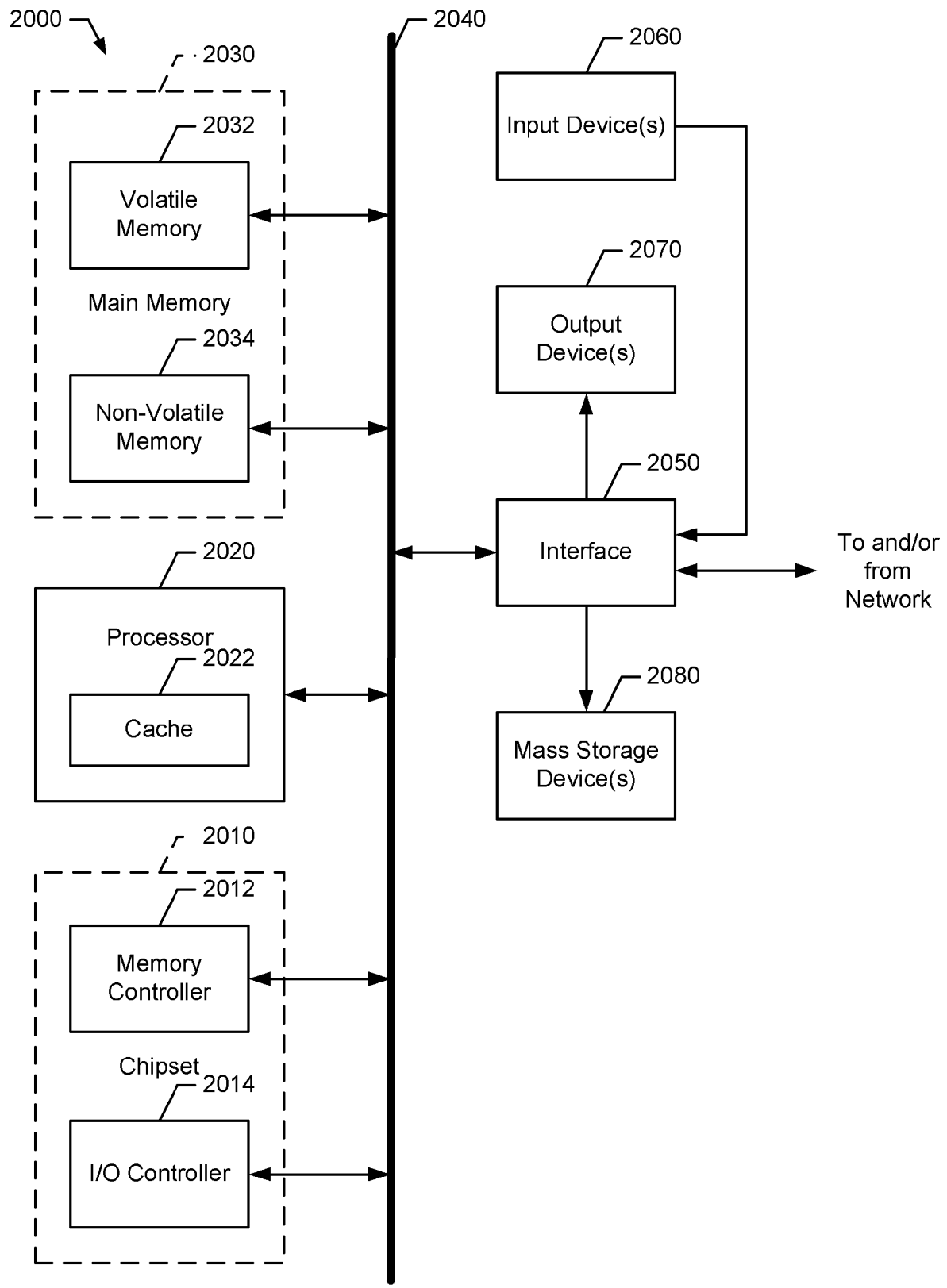
FIG. 7 is a block diagram representation of an example processor system that may be used to implement an example mobile station of FIG. 3.

FIG. 7 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 7 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a nonvolatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 7 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:
1. A method comprising:
identifying, by a mobile station, a first plurality of communication nodes and a second plurality of communication nodes, each of the first plurality of communication nodes being associated with a first wireless coverage characteristic area and each of the second plurality of commu- nication nodes being associated with a second wireless coverage characteristic area;

generating, by the mobile station, a first list of communication nodes associated with the first plurality of communication nodes and a second list of communication nodes associated with the second plurality of communication nodes based on neighborhood information associated with one or more neighboring communication nodes, wherein the mobile station is configured to establish a direct wireless communication link with respective communication nodes from the first list of communication nodes and the second list of communication nodes; and selecting, by the mobile station, a communication node from one of the first plurality of communication nodes or the second plurality of communication nodes to be associated with for wireless communication between the mobile station and the selected communication node.

2. A method as defined in claim 1, wherein said identifying the first plurality of communication nodes and the second plurality of communication nodes comprises identifying a plurality of high density access points and a plurality of roaming support access points, each high density access point being associated with a high density cell and each roaming support access point being associated with a roaming support cell.

3. A method as defined in claim 1, wherein said identifying the first plurality of communication nodes and the second plurality of communication nodes comprises identifying at least one of a plurality of mesh points or a plurality of base stations.

4. A method as defined in claim 1, wherein said selecting the communication node to associate with for wireless communication comprises generating a beacon table, and wherein the beacon table includes at least one of a basic service set identifier (BSSID) associated with each of the plurality of high density cells, a received signal strength indication (RSSI) value of a beacon message associated with the BSSID, or a counter indicative of a total number of changes in the maximum RSSI value.

5. A method as defined in claim 1, wherein said selecting the communication node to associate with for wireless communication comprises generating a roaming table, and wherein the roaming table includes at least one of a basic service set identifier (BSSID) associated with each of the plurality of high density cells, a timestamp associated with the BSSID, or a counter indicative of a total number of handovers between high density access points.

6. A method as defined in claim 1, wherein said selecting the communication node to associate with for wireless communication comprises selecting one of a plurality of high density access points in response to one of a condition indicative of failure to detect a change in the maximum received signal strength indication value, a condition indicative of failure to detect a change in location of a mobile station, or receipt of a handover message from a roaming support access point.

7. A method as defined in claim 1, wherein said selecting the communication node to associate with for wireless communication comprises selecting one of a plurality of roaming support access points in response to one of a condition indicative of exceeding a threshold of changes in the maximum received signal strength indication value, a condition indicative of exceeding a threshold of handovers between high density access points, or receipt of a handover message from a high density access point.

8. An article of manufacture comprising:
a storage medium; and
a plurality of programming instructions stored on the storage medium and configured to program a computing device to:

identify, by a mobile station, a first plurality of communication nodes and a second plurality of communication nodes, each of the first plurality of communication nodes being associated with a first wireless coverage characteristic area and each of the second plurality of communication nodes being associated with a second wireless coverage characteristic area;

generate, by the mobile station, a first list of communication nodes associated with the first plurality of communication nodes and a second list of communication nodes associated with the second plurality of communication nodes based on neighborhood information associated with one or more neighboring communication nodes, wherein the mobile station is configured to establish a direct wireless communication link with respective communication nodes from the first list of communication nodes and the second list of communication nodes; and select, by the mobile station, a communication node from one of the first plurality of communication nodes or the second plurality of communication nodes to be associated with for wireless communication between the mobile station and the selected communication node.

9. An article of manufacture as defined in claim 8, wherein the plurality of programming instructions are configured to program a computing device to identify the first plurality of communication nodes and the second plurality of communication nodes by identifying a plurality of high density access points and a plurality of roaming support access points, and wherein each high density access point is associated with a high density cell and each roaming support access point is associated with a roaming support cell.

10. An article of manufacture as defined in claim 8, wherein the plurality of programming instructions are configured to program a computing device to select the communication node to associate with for wireless communication by generating a beacon table, and wherein the beacon table includes at least one of a basic service set identifier (BSSID) associated with each of the plurality of high density cells, a received signal strength indication (RSSI) value of a beacon message associated with each BSSID, or a counter indicative of a total number of changes in the maximum RSSI value.

11. An article of manufacture as defined in claim 8, wherein the plurality of programming instructions are configured to program a computing device to select the communication node to associate with for wireless communication by generating a roaming table, and wherein the roaming table includes at least one of a basic service set identifier (BSSID) associated with each of the plurality of high density cells, a timestamp associated with the BSSID, or a counter indicative of a total number of handovers between high density access points.

12. An article of manufacture as defined in claim 8, wherein the plurality of programming instructions are configured to program a computing device to select the communication node to associate with for wireless communication by selecting one of a plurality of high density access points in response to one of a condition indicative of failure to detect a change in the maximum received signal strength indication value, a condition indicative of failure to detect a change in location of a mobile station, or receipt of a handover message from a roaming support access point.

13. An article of manufacture as defined in claim 8, wherein the plurality of programming instructions are configured to program a computing device to select the communication node to associate with for wireless communication by selecting one of a plurality of roaming support access points in response to one of a condition indicative of exceeding a threshold of changes in the maximum received signal strength indication value, a condition indicative of exceeding a threshold of handovers between high density access points, or receipt of a handover message from a high density access point.

14. An apparatus comprising:
a communication interface;
a communication node identifier operatively coupled to the communication interface to identify a first plurality of communication nodes and a second plurality of communication nodes, each of the first plurality of communication nodes being associated with a first wireless coverage characteristic area and each of the second plurality of communication nodes being associated with a second wireless coverage characteristic area;
a list generator operatively coupled to the communication node identifier to generate a first list of communication nodes associated with the first plurality of communication nodes and a second list of communication nodes associated with the second plurality of communication nodes based on neighborhood information associated with one or more neighboring communication nodes, wherein the mobile station is configured to establish a direct wireless communication link with respective communication nodes from the first list of communication nodes and the second list of communication nodes; and
a communication node selector operatively coupled to the communication node identifier to select a communication node from one of the first plurality of communication nodes or the second plurality of communication nodes to be associated with for wireless communication between the communication interface and the selected communication node.

15. An apparatus as defined in claim 14, wherein the communication node identifier is configured to identify a plurality of high density access points and a plurality of roaming support access points, and wherein each high density access point is associated with a high density cell and each roaming support access point is associated with a roaming support cell.

16. An apparatus as defined in claim 14, wherein the communication node identifier is configured to identify one of a plurality of mesh points, or a plurality of base stations.

17. An apparatus as defined in claim 14, wherein the communication node identifier comprises a table generator to generate a beacon table, and wherein the beacon table includes at least one of a basic service set identifier (BSSID) associated with each of the plurality of high density cells, a received signal strength indication (RSSI) value of a beacon message associated with the BSSID, or a counter indicative of a total number of changes in the maximum RSSI value.

18. An apparatus as defined in claim 14, wherein the communication node identifier comprises a table generator to generate a roaming table, and wherein the roaming table includes at least one of a basic service set identifier (BSSID) associated with each of the plurality of high density cells, a timestamp associated with the BSSID, or a counter indicative of a total number of handovers between high density access points.

19. An apparatus as defined in claim 14, wherein the communication node selector is configured to select one of a plurality of high density access points in response to one of a condition indicative of failure to detect a change in the maximum received signal strength indication value, a condition indicative of failure to detect a change in location of a mobile station, or receipt of a handover message from a roaming support access point.

20. An apparatus as defined in claim 14, wherein the communication node selector is configured to select one of a plurality of roaming support access points in response to one of a condition indicative of exceeding a threshold of changes in the maximum received signal strength indication value, a condition indicative of exceeding a threshold of handovers between high density access points, or receipt of a handover message from a high density access point.

21. A system comprising:
a flash memory; and
a processor coupled to the flash memory to identify a first plurality of communication nodes and a second plurality of communication nodes, to select a communication node from one of the first plurality of communication nodes or the second plurality of communication nodes to be associated with for wireless communication between the processor and the selected communication node, and to generate a first list of communication nodes associated with the first plurality of communication nodes and a second list of communication nodes associated with the second plurality of communication nodes based on neighborhood information associated with one or more neighboring communication nodes,
wherein the mobile station is configured to establish a direct wireless communication link with respective communication nodes from the first list of communication nodes and the second list of communication nodes, and
wherein each of the first plurality of communication nodes is associated with a first wireless coverage characteristic area and each of the second plurality of communication nodes is associated with a second wireless coverage characteristic area.

22. A system as defined in claim 21, wherein the processor is configured to identify a plurality of high density access points and a plurality of roaming support access points, and wherein each high density access point is associated with a high density cell and each roaming support access point is associated with a roaming support cell.

23. A system as defined in claim 21, wherein the processor is configured to generate a beacon table including information associated with a plurality of high density cells, and wherein the beacon table includes at least one of a basic service set identifier (BSSID) associated with each of the plurality of high density cells, a received signal strength indication (RSSI) value of a beacon message associated with the BSSID, or a counter indicative of a total number of changes in the maximum RSSI value.

24. A system as defined in claim 21, wherein the processor is configured to generate a roaming table including information associated with a plurality of high density cells, and wherein the roaming table includes at least one of a basic service set identifier (BSSID) associated with each of the plurality of high density cells, a timestamp associated with the BSSID, or a counter indicative of a total number of handovers between high density access points.

25. A system as defined in claim 21, wherein the processor is configured to select one of a plurality of high density access points in response to one of a condition indicative of failure to detect a change in the maximum received signal strength indication value, a condition indicative of failure to detect a change in location of a mobile station, or receipt of a handover message from a roaming support access point.

26. A system as defined in claim 21, wherein the processor is configured to select one of a plurality of roaming support access points in response to one of a condition indicative of exceeding a threshold of changes in the maximum received signal strength indication value, a condition indicative of exceeding a threshold of handovers between high density access points, or receipt of a handover message from a high density access point.

* * * * *